United States Patent
Orava (10) Patent No.: US 8,221,523 B2
(45) Date of Patent: Jul. 17, 2012

(54) APPARATUS FOR THE UNINTERRUPTIBLE FILTERING OF GAS

(75) Inventor: John E. Orava, Edgewood, IL (US)

(73) Assignee: Orava Applied Technologies Corporation, Albany, NY (US)

( * ) Notice: Subject to any disclaimer, the term of this patent is extended or adjusted under 35 U.S.C. 154(b) by 558 days.

(21) Appl. No.: 12/064,049

(22) PCT Filed: Oct. 13, 2006

(86) PCT No.: PCT/US2006/040177
§ 371 (c)(1),
(2), (4) Date: Feb. 18, 2008

(87) PCT Pub. No.: WO2007/047484
PCT Pub. Date: Apr. 26, 2007

(65) Prior Publication Data
US 2008/0190287 A1    Aug. 14, 2008

Related U.S. Application Data (60) Provisional application No. 60/726,154, filed on Oct. 13, 2005.

(51) Int. Cl.
*B01D 46/46* (2006.01)
(52) U.S. Cl. ........... 95/23; 95/1; 95/10; 95/113; 96/108; 96/150; 165/167; 454/237; 454/239; 454/241
(58) Field of Classification Search .................. 95/1, 10, 95/23, 113; 55/290; 96/108, 150, 10; 454/237, 454/239, 241
See application file for complete search history.

(56) References Cited

U.S. PATENT DOCUMENTS

| | | | | |
|---|---|---|---|---|
| 333,463 A | * | 12/1885 | Holt | 55/290 |
| 457,127 A | * | 8/1891 | Luce | 310/50 |
| 2,700,537 A | * | 1/1955 | Pennington | 261/83 |
| 3,703,697 A | * | 11/1972 | Nicholas | 338/35 |
| 4,474,021 A | * | 10/1984 | Harband | 62/94 |
| 4,557,185 A | * | 12/1985 | Harriman | 454/348 |
| 5,090,972 A | * | 2/1992 | Eller et al. | 95/10 |
| 5,572,799 A | * | 11/1996 | Masuyuki et al. | 34/80 |
| 6,355,091 B1 | * | 3/2002 | Felber et al. | 95/10 |
| 6,612,365 B1 | * | 9/2003 | Saishu et al. | 165/54 |
| 6,695,692 B1 | * | 2/2004 | York | 454/199 |
| 6,718,783 B2 | * | 4/2004 | Ohga et al. | 62/244 |
| 7,150,314 B2 | * | 12/2006 | Moffitt | 165/249 |

(Continued)

FOREIGN PATENT DOCUMENTS

| | | |
|---|---|---|
| DE | 4224391 | 1/1994 |
| GB | 2014299 | 8/1979 |

(Continued)

*Primary Examiner* — Jason M Greene
*Assistant Examiner* — Anthony Shumate
(74) *Attorney, Agent, or Firm* — Schmeiser, Olsen & Watts, LLP (57) ABSTRACT

The invention is an apparatus and method for filtering a volume of gas. In one embodiment, the invention is a filtering apparatus having a hollow vessel with inlets and outlets, channels in communication with the inlets and outlets, a form of filter media, and an uninterruptible flow controlling device for regulating the circulation of gas within the apparatus. In another embodiment, the invention is a method incorporating an uninterruptible filtering apparatus to remove evaporated liquid from a volume of gas by passing the gas over a filter media contained within a hollow vessel.

15 Claims, 4 Drawing Sheets

U.S. PATENT DOCUMENTS

| | | | |
|---|---|---|---|
| 7,389,646 B2 * | 6/2008 | Moffitt | 62/92 |
| 7,632,178 B2 * | 12/2009 | Meneely, Jr. | 454/239 |
| 7,900,694 B2 * | 3/2011 | Jee et al. | 165/202 |
| 2006/0199513 A1 * | 9/2006 | Choi et al. | 454/237 |

FOREIGN PATENT DOCUMENTS

| | | |
|---|---|---|
| JP | 62183838 | 8/1987 |
| WO | 00/33940 | 6/2000 |
| WO | WO 2005115780 A1 * | 12/2005 |

* cited by examiner

APPARATUS FOR THE UNINTERRUPTIBLE FILTERING OF GAS

CROSS REFERENCE TO RELATED APPLICATION

This application hereby claims the benefit of commonly owned pending U.S. Provisional Patent Application Ser. No. 60/726,154, for Uninterruptible Evaporate Removal, Storage, and Transfer Device, filed Oct. 13, 2005. This application claims priority to PCT/US06/40177.

BACKGROUND OF THE INVENTION

The present invention relates to the field of evaporated liquid removers. More specifically, the invention relates to a device for eliminating moisture in an environment.

Devices such as dehumidifiers, air-conditioners, desiccant-based devices, and the like remove excess moisture from the air. Known devices for this purpose are electrically powered dehumidifiers that remove evaporated liquid from a gas by passing the liquid-laden gas over a cooled surface where the evaporated liquid condenses, thereby reducing the evaporated liquid content of the gas.

A problem with conventional evaporated liquid removers is their reliance upon utility-provided electrical power (via an electrical grid) or fueled generators to function. As a result, conventional evaporated liquid removers cease to operate following a disaster (e.g., hurricane or electrical storm) that damages a community's utility infrastructure. Failure of the conventional evaporated liquid removers results in the growth of mold (e.g., black mold) within a building or dwelling. The mold damages or destroys wall surfaces, rugs, floors, textile-based furniture coverings, and similar articles contained within a building or dwelling. Further, the growth of mold presents a health hazard to occupants of the building or dwelling and to repair crews during reconstruction efforts.

An additional problem with known devices is their inability to operate on low-voltage, low-current power sources such as small photovoltaic cells or other small nature-powered electrical generating devices.

Although known devices may be suitable for the particular purpose to which they address, they are not suitable for uninterruptible reduction, removal, storage, and transfer of an evaporated liquid. In this respect, the apparatus for the uninterruptible filtering of a volume of gas according to the present invention substantially departs from the conventional concepts and designs provided in the prior art. In so doing, the present invention is ideally suited for situations requiring the uninterrupted reduction, removal, storage, and transfer of an evaporated liquid contained in a gas.

SUMMARY OF THE INVENTION

In one aspect the invention is an apparatus for filtering a volume of gas. The apparatus contains a hollow vessel having at least one inlet to and at least one outlet from an internal cavity defined by the vessel. A filter or filtering media, such as a desiccant or other adsorbing or absorbing material, is provided to perform the filtering. A flow controlling device, such as an electric fan or impeller, is mounted within or adjacent to an end of the vessel to regulate the flow of gas through the system.

In another aspect, the invention is a method for filtering a volume of gas using a filtering device. Gas is drawn into the device through at least one inlet and passes over a filter media, which separates the undesired suspended matter from the gas. The filtered gas is then discharged through at least one outlet.

The foregoing, as well as other objectives and advantages of the invention and the manner in which the same are accomplished, is further discussed within the following detailed description and its accompanying drawings.

BRIEF DESCRIPTION OF THE DRAWINGS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements.

DETAILED DESCRIPTION

The invention relates to an apparatus for the uninterruptible filtering of a volume of gas. More specifically, the invention relates to an apparatus for removing excess moisture from the air using a filtering device powered independently of electricity provided by a utility via an electrical (or power) grid.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For ease of discussion, the apparatus will be described with reference to the removal of excess evaporated liquid from the air within an environment. Those having ordinary skill in the art will recognize that the invention is applicable to any application where undesirable matter is suspended in a gas (e.g., moisture or contaminants). The use of the term "filter" or "filtering" is intended to include any device or process that separates distinct components from within a gas and is not intended to indicate only the removal of solid particulate by means of a screen or strainer.

The concept of a component or element of the invention being "between" two other components does not necessarily imply that the three components are contiguous (i.e., in intimate contact). Rather, as used herein, the concept of one component being between two other components is meant to describe the relative positions of the components within the assembly structure, respectively.

Those skilled in the art will also appreciate that the term "adjacent" refers to two or more, for example, components or elements that have a common border or are in close proximity to one another. Nevertheless, it will be understood that adjacent may or may not imply contact, but always implies the absence of anything of the same kind in between.

Figure 1:
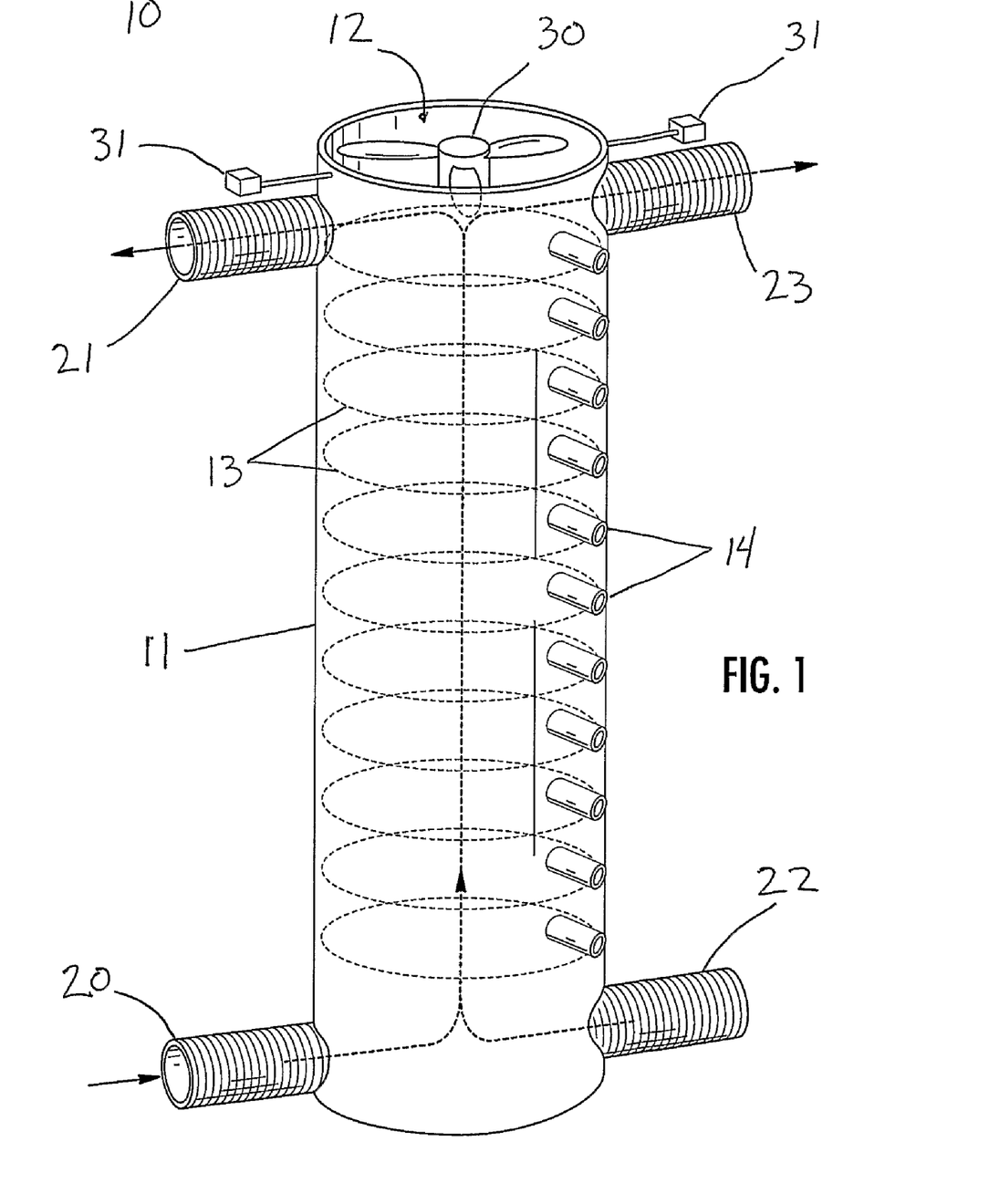
FIG. 1 is a perspective view of one embodiment of the apparatus having a cylindrical vessel, four channels that may serve as inlets or outlets, an electric fan, two sensors, and a plurality of openings for accessing the filter media.

In one aspect, the invention is an apparatus 10 for filtering a volume of gas. The filtering of a volume of gas is accomplished through a combination of elements in this apparatus 10. Referring to FIG. 1, the invention provides a hollow vessel 11 defining an internal cavity 12 for containing various elements of the apparatus 10. The internal cavity 12 is accessible via a first inlet 20 and a first outlet 21. The first inlet 20 and first outlet 21 provide a flow path into and out of the internal cavity 12 of the hollow vessel 11. The hollow vessel 11 may be formed in any number of shapes, such as a cylinder, a cube, a sphere, a rectangular prism, or any other shape for a container known in the art (see FIGS. 1 and 3).

Figure 2A:
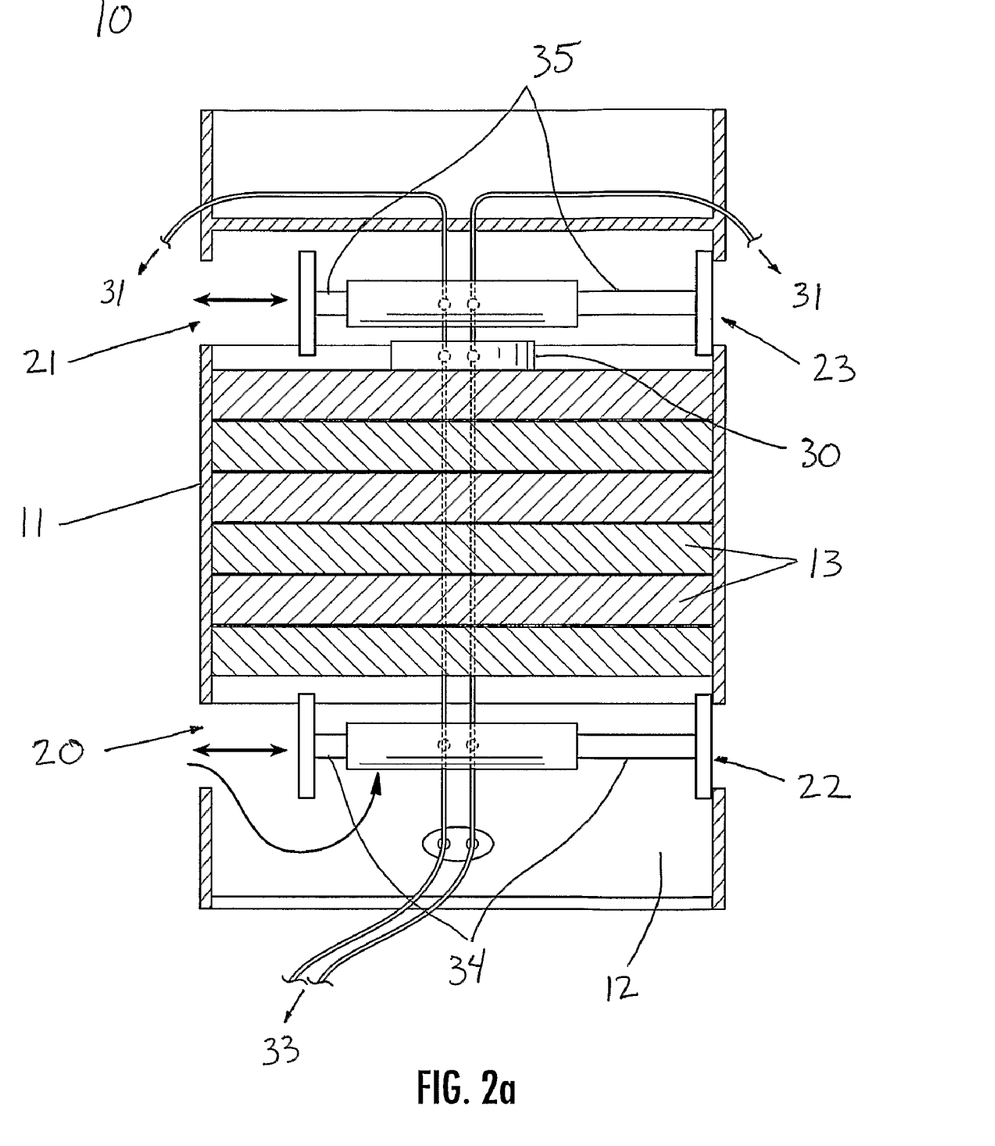
FIG. 2a is a cross-sectional side view of one embodiment of the apparatus having an electric fan connected to a power source and two sensors, and four solenoid-controlled valves regulating the flow paths into and out of the inlets and outlets.
Figure 2B:
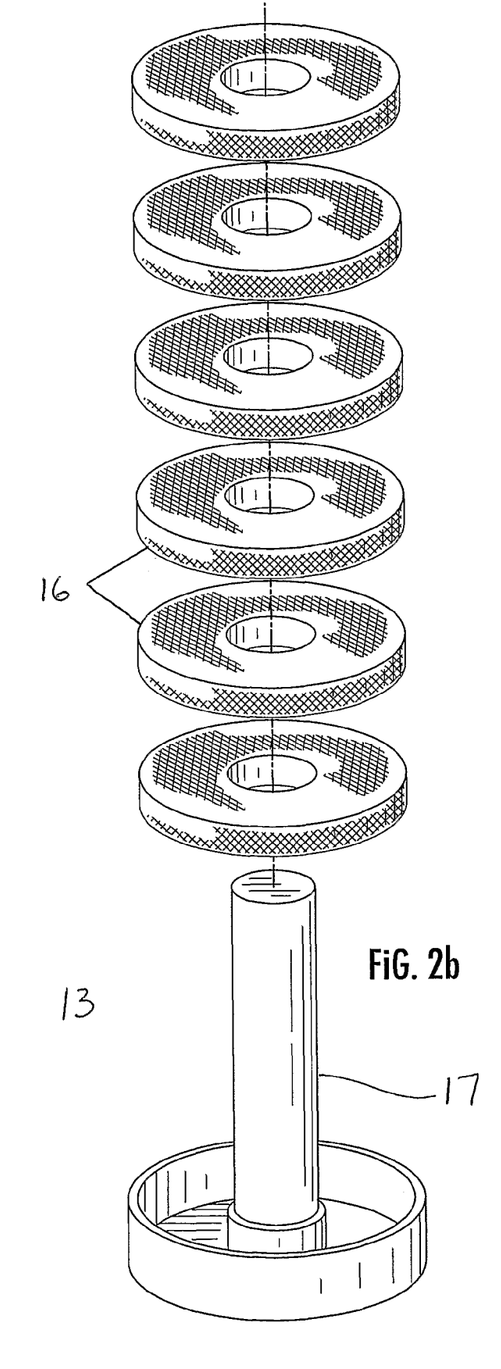
FIG. 2b is a perspective view of one embodiment of the filter media for the apparatus depicting an exploded view of a series of stackable disc filters on a central hub.
Figure 2C:
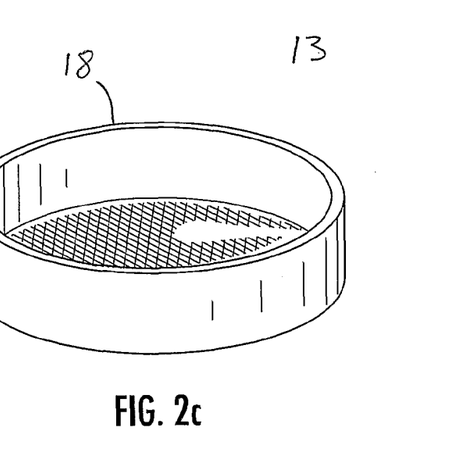
FIG. 2c is a perspective view of another embodiment of the filter media in the form of a circular tray capable of holding a filtering substance.

With reference to FIGS. 2b and 2c, the invention further provides filter media 13 for separating components of the volume of gas brought into the internal cavity 12 of the hollow vessel 11. In one embodiment, the filter media 13 may include one or more stackable disc filters 16 positioned on a central hub 17. In another embodiment, filter media 13 may be contained within a circular tray 18 capable of holding a filtering substance. The filter media 13 may include desiccants, conditioners, modifiers, ionization devices, acids, salts, other liquid adsorbing or absorbing materials or chemicals, or any combination of the above. The process of separating components accomplished by the filter media 13 may encompass removing unwanted suspended particles, viruses, or bacteria from within a gaseous mixture. That said, the embodiment discussed in detail serves to remove excess evaporated liquid from a volume of air.

Further provided is a flow control device 30 as depicted in FIG. 1 for advancing the volume of gas across the filter media 13. Preferably, the flow control device 30 requires little to no electric power such that it can operate in the event of a power failure in an electrical grid, meaning the failure of electricity provided to a region, city, community, or building by a central utility or fuel-fired generator. The apparatus 10 may thus remain operational in emergency situations (e.g., post-natural disaster). Examples of such a flow control device 30 include small electric fans or impellers requiring a low-voltage power source. The flow control device 30 may be positioned within the hollow vessel 11 and adjacent to the inlet 20 or outlet 21 of the hollow vessel, or any position facilitating the effective drawing of the volume of gas into the internal cavity 12 through the inlet 20, across the filter media 13 contained within the hollow vessel 11, and then out through the outlet.

Referring to FIG. 1, the apparatus 10 may also include at least one sensor 31 configured to identify the presence or characteristics of a gaseous component, a vapor component, a liquid component, a solid component, a particulate component, a bacterial component, a viral component, and combinations thereof in the environment to be filtered. In one embodiment, the sensor 31 detects the relative humidity of the air in an environment. The measurements taken by the sensor 31 may then be output by a transmitter to a controller. The signal transmitted from the sensor 31 to the controller may be a simple "on or off" value to indicate the presence of a component or a specific measurement of a component. Alternatively, the signal may provide the precise value of a measurement.

The controller used in conjunction with the sensor 31 receives the signal from the sensor. The controller in turn is connected to the flow control device 30 and is capable of regulating the operation of the flow control device. The way in which the controller regulates the operation of the flow control device 30 depends upon the signal received from the sensor 31 and the kind of controller used.

For example, if the sensor 31 produces a simple "on or off" signal, or if the controller is only capable of "on or off" commands, the controller may turn the flow control device 30 on or off in response to the conditions measured by the sensor. Alternatively, if the sensor 31 provides a signal containing precise values, and the controller and flow control device 30 are capable of variable outputs, the controller may regulate the intensity of output from the flow control device 30 based upon the difference between the values measured by the sensor 31 and the target value. In other words, the controller may turn the flow control device 30 to maximum power if the sensor 31 detects an excessive amount of the undesirable component in the environment measured.

Figure 3:
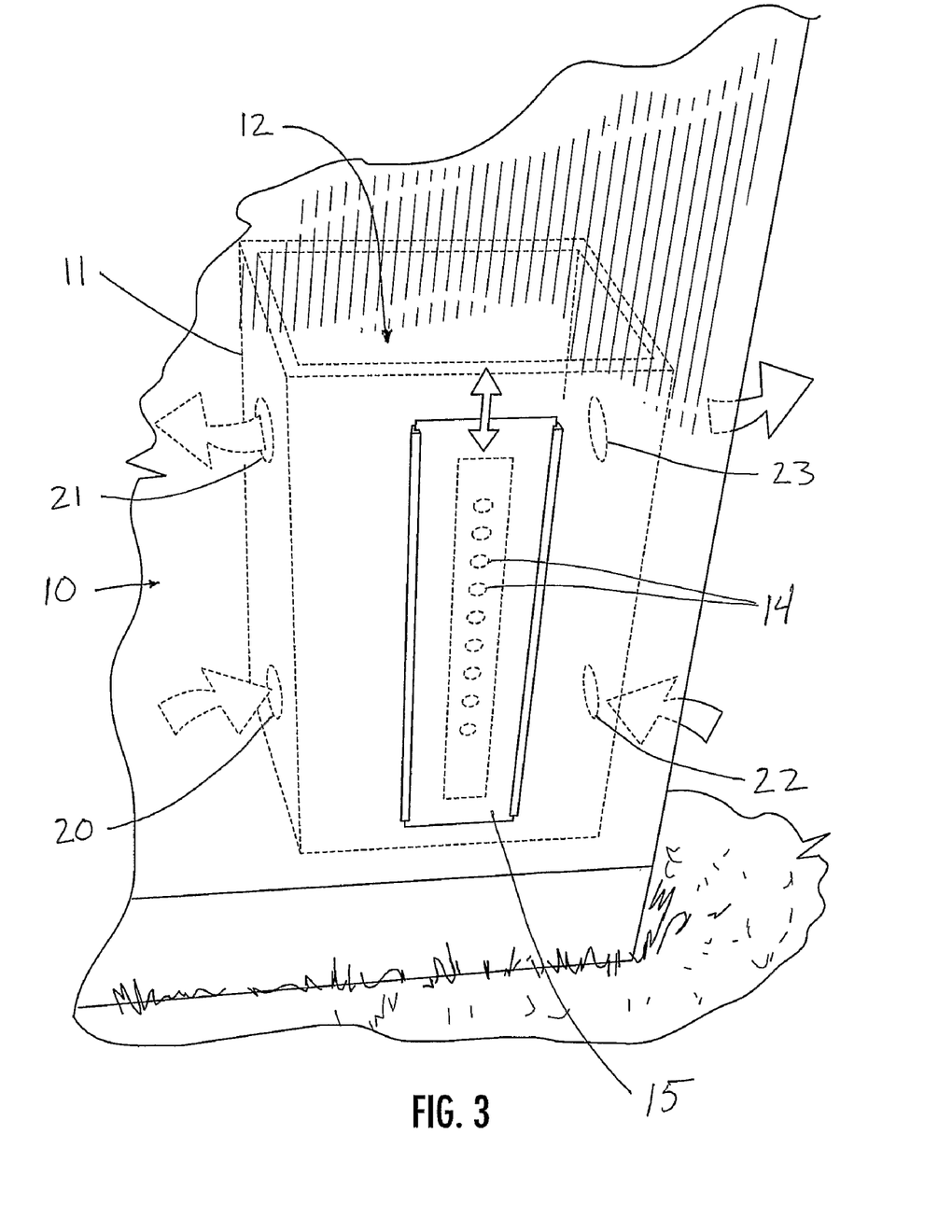
FIG. 3 is a view of one embodiment of the apparatus incorporated into a building wall and having a rectangular shape and a plurality of openings for accessing the filter media contained within the apparatus.

Further, if there are multiple environments involved in the operation of the apparatus 10, such as an interior and exterior of a building, additional sensors 31 may be provided to likewise measure the composition or characteristics of the additional environments. The additional sensors 31 also communicate via a transmitter with the controller to control the operation of the flow control device 30. For example, one sensor 31 may measure the relative humidity of the air in the interior of a building, and a second sensor 31 may measure the humidity of the ambient air outside of the building. The controller may then regulate the operation of a fan to draw outside air through the apparatus 10 to provide fresh air having a pre-selected humidity as depicted in FIG. 3.

In one embodiment, the signal transmitted from the sensor 31 is a measurement of the relative humidity of the air in a selected environment (e.g., first or second environment). The controller regulates the operation of the flow control device 30 to maintain the relative humidity of the environment within a predetermined range of values. For instance, it may be desirable to keep the humidity of the air in a building below 60% to prevent the growth of mold and other fungi capable of destroying articles contained within the building (e.g., carpet, furniture, curtains, and foodstuffs).

The apparatus 10 may also provide a power supply 33 to provide electric power to the powered components of the apparatus 10, such as the flow control device 30, the controller, and the sensors 31. Because the apparatus 10 is intended to operate uninterrupted, even in the event of a natural disaster or other loss of utility power, the power supply 33 will preferably operate independently of utility-provided electricity or fueled generators. Even with this limitation, there exist a variety of devices that may serve as the power supply 33 for this apparatus 10. For example, a photovoltaic cell may provide the necessary power to drive the flow control device 30, the controller, and the sensors 31. Other power supply devices suitable for this use include batteries and other small nature-powered electrical generating devices.

Referring to FIG. 2a, the apparatus 10 may also include a number of flow regulators 34, 35, such as valves, serving to control the flow of the volume of gas into or out of the inlets and outlets of the hollow vessel 11. An inlet flow regulator 34 may control the flow of gas into the first inlet 20. A outlet flow regulator 35 may control the flow of the filtered gas out of the first outlet 21.

In one embodiment, the inlet and outlet flow regulators 34, 35 are solenoid-operated valves as illustrated in FIG. 2a. Further, because one embodiment of the apparatus 10 is intended to operate in the absence of utility-provided electric power, the solenoid-operated valves may operate with a low-voltage power source as disclosed above. With that limitation, magnets may be employed to maintain the position of the valves 34 and 35 (e.g., secured to an internal surface of the hollow vessel 11). In such an arrangement, the positioning of the valves 34, 35 does not require a constant draw of power. In this embodiment, the invention may provide a capacitor in communication with the valves 34, 35 to provide a sufficient burst of current to overcome the magnetic bond securing the valves 34, 35 to the hollow vessel 11 and operate the solenoid. Of course, this example is but one possible flow regulator that may be used. Many other magnetic, hydraulic, air, memory metal, or other means of opening and closing channels, ducts, or passageways may be employed to accomplish this function.

The apparatus 10 may additionally provide a second inlet 22 for conveying a volume of gas into the hollow vessel 11 (see FIGS. 1, 2a, and 3). The second inlet 22 may convey gas from a different environment than that from which the first inlet 20 draws. For example, the first inlet 20 may draw air from a space within the interior of a building (e.g., a first environment) while the second inlet 22 may draw air from the exterior of the building (e.g., a second environment) as depicted in FIG. 3. Alternatively, the second inlet 22 may draw from a different location within the same environment. An example of this alternative would be a situation wherein the first inlet 20 and second inlet 22 draw air from opposite sides of a single room in a building. These two situations are described only as examples of the variety of applications requiring multiple inlets.

Likewise, a second outlet 23 may be provided for conveying a volume of filtered gas out of the hollow vessel 11. The second outlet 23 may convey the filtered gas to an environment other than that into which the first outlet 21 discharges. The second outlet 23 thus provides an optional avenue for discharging the volume of filtered gas. For example, moisture laden air drawn by the apparatus 10 from a space contained within a building (i.e., a first environment) and then filtered may either be discharged through the first outlet 21 back into the same space or through the second outlet 23 to the exterior of the building (i.e., a second environment).

In a similar configuration with respect to the first inlet 20 and first outlet 21, flow regulators 34, 35 may control the flow of gas into and out of the hollow vessel 11 through the second inlet 22 and second outlet 23, respectively. Depending on the intended operation of the apparatus 10, the additional inlets and outlets may correspond with separate flow regulators or, or they may share the flow regulators 34, 35 corresponding with the first inlet 20 and first outlet 21.

For example, in the embodiment shown in FIG. 2a, the first inlet 20 and first outlet 21 are positioned on opposite sides of the hollow vessel 11 from the second inlet 22 and second outlet 23, respectively. The solenoid-operated valves serving as the flow regulators 34, 35 in this embodiment are positioned with one valve 34 in between the pair of inlets 20, 22, and another valve 35 in between the pair of outlets 21, 23. The valve 34 associated with the inlets is configured to open the first inlet 20 when the second inlet 22 is closed, and vice versa. Likewise, the valve 35 associated with the outlets is configured to open the first outlet 21 when the second outlet 23 is closed, and vice versa. As a result, this configuration allows for the volume of gas—filtered or unfiltered—to be conveyed from either the first inlet 20 or the second inlet 22, and exhausted through either the first outlet 21 or the second outlet 23.

Referring to FIGS. 1 and 3, the apparatus 10 may also include at least one opening 14 in the hollow vessel 11 that permits access to the filter media 13 for purposes of filling, emptying, or otherwise maintaining the filter media 13. The openings 14 may include a series of small openings as shown in FIGS. 1 and 3. This arrangement permits solid materials (e.g., desiccant beads) or liquids used as the filter media 13 to be pumped into and evacuated from the hollow vessel 11. Provided in conjunction with these openings 14 may be a cover 15 serving to protect the filter media 13 when not being maintained. One example is a cover strip having protrusions on one side that correspondingly engage the openings 14.

With specific reference to the figures depicting various embodiments of the invention, FIG. 1 illustrates one embodiment of the apparatus 10 having a cylindrical hollow vessel 11, a first inlet 20, a second inlet 22, a first outlet 21, a second outlet 23, a fan that serves as the flow control device 30, two sensors 31 that may measure the composition or characteristics of the environment on either side of the hollow vessel 11, and a small opening 14 associated with each layer of the filter media 13 that allows for maintenance access.

In this embodiment, a volume of gas is supplied to either or both of the first inlet 20 and second inlet 22 at the bottom of the hollow vessel 11. The volume of gas is then advanced upwards through the filter media 13 by means of the fan serving as the flow control device 30. Once the volume of air passes through each layer of the filter media 13 and reaches the top of the hollow vessel 11, it is then exhausted through either or both of the first outlet 21 or the second outlet 23.

FIG. 2a depicts another embodiment of the apparatus 10 having an electric fan connected to a power supply 33 and two sensors 31, and four solenoid-controlled valves serving as flow regulators 34, 35 for the first inlet 20, second inlet 22, first outlet 21, and second outlet 23. In this embodiment, the solenoid-controlled valve 34 at a lower end of the apparatus 10 allows flow to be conveyed into the hollow vessel 11 either through the first inlet 20 or the second inlet 22. Likewise, the solenoid-controlled valve 35 at an upper end of the apparatus 10 allows flow to be exhausted from the hollow vessel 11 either through the first outlet 21 or the second outlet 23. In this embodiment, connections from the power supply 33 to the flow regulators 34, 35, sensors 31, and flow control device 30 are shown. The embodiment of the apparatus 10 configured as shown in FIG. 2a allows for gas to be conveyed through the first inlet 20, where it is drawn through the layers of filter media 13 by the flow control device 30, and then the gas is exhausted through the first outlet 21.

FIG. 2b illustrates a perspective view of one embodiment of the filter media 13 for the apparatus 10. In this figure, a series of disposable stackable disc filters 16 are positioned on a central hub 17. In this embodiment, the filter media 13 and hub 17 may be removed and replaced via an opening 14 provided at the top or side of the hollow vessel 11.

FIG. 2c depicts another embodiment of the filter media 13 in the form of a circular tray 18 capable of holding a filtering substance. In this embodiment, the filter media 13 may be likewise be removed and replaced via an opening 14 provided at the top or side of the hollow vessel 11.

FIG. 3 illustrates another embodiment of the apparatus 10 incorporated into the corner of a building, wherein the hollow vessel 11 is rectangular shape and includes a plurality of openings 14 for accessing (i.e., removing and replacing) the filter media 13. The openings 14 are protected by a cover 15 for use at times when the filter media 13 is not being maintained.

In another aspect, the invention is a method of filtering a volume of gas using an apparatus 10 as described above. In a first step, the method includes providing an apparatus 10 that includes a hollow vessel 11 defining an internal cavity 12, a first inlet 20, and a first outlet 21. The hollow vessel 11 for use in this method also contains filter media 13 for separating components of a volume of gas conveyed into the hollow vessel 11. The hollow vessel 11 further contains a flow control device 30 for directing the volume of gas through the hollow vessel 11 and over the filter media 13.

In a next step, the method includes directing a volume of gas into the first inlet 20 of the hollow vessel 11 and across the filter media 13. Upon arrival at the filter media 13, the method includes separating components of the volume of gas to form a filtered volume of gas. As this invention is intended to operate continuously as needed, even in the event of a major disaster or other loss of utility-provided power, it is important that the step of separating continues uninterrupted until a pre-selected condition is achieved. The pre-selected condition may, for example, be the reduction of the relative humidity in the air within an environment sought to be filtered, the elimination of a contaminant or otherwise undesirable suspended matter in a volume of gas, or any other measurable characteristic or composition of a volume of gas.

The method further provides an apparatus 10 that facilitates communication between a first environment and a second environment. As configured in this one embodiment, the apparatus 10 draws a volume of gas from either the first environment or the second environment.

The method may further involve the step of directing the filtered volume of gas through the first outlet 21 after the components of the volume of gas are separated. Much like the options available for the inlets, the filtered volume of gas may be exhausted from the apparatus 10 into either the first environment or the second environment.

If the availability of more than one flow path is desired when using a single apparatus 10, a second inlet 22 and a second outlet 23 may be provided. In this embodiment, the first inlet 20 and first outlet 21 are in communication with the first environment, and the second inlet 22 and second outlet 23 are in communication with the second environment. The method may be performed in this arrangement by drawing gas from either the first environment or the second environment and then expelling the filtered gas into either the first environment or the second environment.

The apparatus 10 used for the method may also include at least one sensor 31 for measuring the pre-selected indicator or indicators in the environment to be filtered. In this embodiment, the method further includes the step of regulating the operation of the flow control device 30 in response to the signal communicated by the sensor 31. Although the step of regulating occurs continuously as the apparatus 10 operates, in one embodiment of the method the regulating step is performed before the step of separating the components of the volume of gas so as to ensure the pre-selected condition is achieved.

In the specification, drawings, and examples, there have been disclosed typical embodiments of the invention and, although specific terms have been employed, they have been used in a generic and descriptive sense only and not for purposes of limitation, the scope of the invention being set forth in the following claims.

The invention claimed is:

1. An apparatus for filtering a volume of gas, said apparatus comprising:

a hollow vessel defining an internal cavity;

a first inlet defined by said hollow vessel, the first inlet exposed to a first environment, wherein said first inlet is for introducing the volume of gas into said internal cavity of said hollow vessel;

a first outlet defined by said hollow vessel, the first outlet exposed to the first environment, wherein said first outlet is for removing the volume of gas from said internal cavity of said hollow vessel and discharging into the first environment;

a second inlet defined by said hollow vessel, the second inlet exposed to a second environment, wherein said second inlet is for introducing the volume of gas into said internal cavity of said hollow vessel;

a second outlet defined by said hollow vessel, the second outlet exposed to the second environment, wherein said second outlet is for removing the volume of gas from said internal cavity of said hollow vessel and discharging to the second environment;

a filter media for separating components of the volume of gas within said internal cavity of said hollow vessel, said filter media contained within said internal cavity of said hollow vessel;

a flow control device for advancing the volume of gas across said filter media, said flow control device positioned within said internal cavity of said hollow vessel;

a first sensor exposed to the first environment for measuring in the first environment sought to be filtered at least one indicator and producing a first signal;

a second sensor exposed to the second environment for measuring in the second environment at least one indicator, the second sensor producing a second signal; and a controller for receiving the first signal from said first sensor and the second signal from the second sensor, said controller in communication with said first sensor, said second sensor, and said flow control device;

an outlet flow regulator for controlling the flow of a filtered volume of gas out of said first outlet and said second outlet, said outlet flow regulator positioned between said first outlet and said second outlet and proximate both said first outlet and said second outlet, wherein said outlet flow regulator is configured to open said first outlet when said second outlet is closed, and wherein said outlet flow regulator is configured to open said second outlet when said first outlet is closed; and an inlet flow regulator for controlling the flow of the volume of gas into said first inlet and said second inlet, said inlet flow regulator positioned between said first inlet and said second inlet and proximate both said first inlet and said second inlet, wherein said inlet flow regulator is configured to open said first inlet when said second inlet is closed, and wherein said inlet flow regulator is configured to open said second inlet when said first inlet is closed;

wherein said controller regulates said flow control device in response to the first signal communicated by said first sensor and to the second signal communicated by the second sensor;

wherein said apparatus is capable of operating to filter the volume of gas in the event of a power failure in an electrical grid.

2. The apparatus according to claim 1, wherein:

the signal communicated by said first sensor is a measurement of the relative humidity of the first environment; and said controller regulating the operation of said flow control device to maintain the relative humidity of the first environment within a predetermined range.

3. The apparatus according to claim 1, wherein:

said indicator identifies one or more components selected from the group consisting of a gaseous component, a vapor component, a liquid component, a solid component, a particulate component, a bacterial component, a viral component, and combinations thereof.

4. The apparatus according to claim 1, wherein said inlet flow regulator and said outlet flow regulator is a solenoid-operated valve.

5. The apparatus according to claim 1, further comprising a power supply in communication with said flow control device, said power supply providing power to said flow control device.

6. The apparatus according to claim 5, wherein said power supply provides power to said flow control device at a pre-selected voltage.

7. The apparatus according to claim 5 wherein said power supply is a photovoltaic cell.

8. The apparatus according to claim 1, further comprising:

at least one opening defined by said hollow vessel, said at least one opening providing access to said filter media, said at least one opening in communication with said internal cavity of said hollow vessel.

9. A method of filtering a volume of gas, said method comprising the steps of:

providing an apparatus comprising a hollow vessel defining an internal cavity, a first inlet, a first outlet, a second inlet, and a second outlet, the hollow vessel facilitating communication between a first environment and a second environment; a flow control device positioned within the hollow vessel; and filter media contained within the internal cavity of the hollow vessel;

directing the volume of gas into the first inlet of the hollow vessel and across the filter media;

controlling a flow of the volume of gas proximate the first inlet and the second inlet with an inlet flow regulator positioned proximate the first inlet and second inlet;

controlling the flow of the volume of gas proximate the first outlet and the second outlet with an outlet flow regulator positioned proximate the first outlet and the second outlet;

separating components of the volume of gas at the filter media to form a filtered volume of gas;

directing the filtered volume of gas through the first outlet, wherein the step of directing the filtered volume of gas comprises directing the filtered volume of gas to the first environment;

measuring, by a first sensor exposed to the first environment, at least one indicator of the first environment; and measuring, by a second sensor exposed to the second environment, at least one indicator of the second environment;

wherein the step of separating continues uninterrupted in the event of a power failure in an electrical grid until a pre-selected condition is achieved in the first or second environment.

10. The method according to claim 9, wherein the step of directing the volume of gas comprises directing the volume of gas into the first inlet from the first environment.

11. The method according to claim 9, wherein the step of directing the volume of gas comprises directing the volume of gas into the first inlet from the second environment.

12. The method according to claim 9, wherein the step of directing the filtered volume of gas comprises directing the filtered volume of gas to the second environment.

13. The method according to claim 9, wherein the first sensor of the apparatus provided produces a first signal, the first sensor positioned substantially adjacent to the hollow vessel, further wherein the second sensor of the apparatus provided produces a second signal.

14. The method according to claim 13, further comprising the step of regulating the operation of the flow control device in response to the first and second signal communicated by the first and second sensor, the step performed after the step of directing the volume of gas.

15. The method of claim 9, wherein:

said at least one indicator of the first and second environment identifies one or more components selected from the group consisting of a gaseous component, a vapor component, a liquid component, a solid component, a particulate component, a bacterial component, a viral component, and combinations thereof

* * * * *